United States Patent
Amirijoo et al.

(10) Patent No.: US 8,526,996 B2
(45) Date of Patent: Sep. 3, 2013

(54) AUTOMATIC PLANNING AND HANDLING OF RANDOM ACCESS ROOT SEQUENCES

(75) Inventors: Mehdi Amirijoo, Linköping (SE); Pål Frenger, Linköping (SE); Fredrik Gunnarsson, Linköping (SE); Johan Moe, Mantorp (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 221 days.

(21) Appl. No.: 13/139,738

(22) PCT Filed: Dec. 14, 2009

(86) PCT No.: PCT/SE2009/051410
§ 371 (c)(1),
(2), (4) Date: Jun. 15, 2011

(87) PCT Pub. No.: WO2010/071561
PCT Pub. Date: Jun. 24, 2010

(65) Prior Publication Data
US 2012/0046065 A1     Feb. 23, 2012

Related U.S. Application Data

(60) Provisional application No. 61/138,597, filed on Dec. 18, 2008.

(51) Int. Cl.
*H04B 7/26* (2006.01)

(52) U.S. Cl.
USPC .......... 455/524; 455/525; 455/450; 455/67.11

(58) Field of Classification Search
USPC ............. 455/524, 525, 67.11, 423, 450, 507, 455/62, 130, 509; 370/311, 312, 357; 375/260, 375/371, 316, 343, 325
See application file for complete search history.

(56) References Cited

U.S. PATENT DOCUMENTS

| | | |
|---|---|---|
| 2006/0172707 A1 | 8/2006 | Stern-Berkowitz et al. |
| 2008/0075043 A1* | 3/2008 | Wang et al. .................... 370/330 |
| 2008/0080643 A1* | 4/2008 | Hwang et al. .................. 375/316 |
| 2011/0158104 A1* | 6/2011 | Frenger et al. ................. 370/241 |
| 2011/0188427 A1* | 8/2011 | Ishii ............................... 370/311 |

OTHER PUBLICATIONS

3rd Generation Partnership Project. "SON Use Case: Cell Phy_ID Automated Configuration." 3GPP TSG-RAN WG3 Meeting #59, R3-080376, Sorrento, Italy, Feb. 11-15, 2008.
3rd Generaton Partnership Project. "RACH Sequence Allocation and Indication to the Cell." 3GPP TSG RAN WG1 Meeting #49, R1-072079, Kobe, Japan, May 7-11, 2007.
Amirijoo, M. et al. "Neighbor Cell Relation List and Physical Cell Identity Self-Organization in LTE." IEEE International Conference on Communications Workshops, Beijing, China, May 19-23, 2008.

* cited by examiner

Primary Examiner — John J Lee
(74) Attorney, Agent, or Firm — Coats & Bennett, P.L.L.C.

(57) ABSTRACT

The present invention relates to a method and a communication network node for enabling automatic planning and handling of root sequences used at random access in a communication network system, wherein user equipments (18) are accessing a cell (19*a*) being served by said communication network node. Root sequence usage information from neighboring cells (19*b*, 19*c*) is acquired. Root sequence conflicts between root sequences used in said served cell (19*a*) and root sequences used in said neighboring cells (19*b*, 19*c*) are detected. When no conflict is detected, appropriate new root sequence(s) is/are selected. Otherwise, detected root sequence conflicts are resolved by deriving a new set of root sequences.

15 Claims, 7 Drawing Sheets

AUTOMATIC PLANNING AND HANDLING OF RANDOM ACCESS ROOT SEQUENCES

TECHNICAL FIELD

The present invention relates to a method and arrangement in a communication network system and, more particular, to an arrangement allowing for enabling automatic planning of root sequences used in random access as well as a method for such enablement.

BACKGROUND

The work of specifying the Evolved Universal Terrestrial Radio Access Network (E-UTRAN) consisting of the Long Term Evolution (LTE) and System Architecture Evolution (SAE) concepts is currently ongoing within the 3$^{rd}$ Generation Partnership Project (3GPP).

One important focus area in E-UTRAN standardization work is to ensure that the new network is simple to deploy and cost efficient to operate. The vision is that the new system shall be self-optimizing and self-configuring in as many aspects as possible. One aspect that benefits from self-optimization and self-configuration is the management of the random access channel (RACH).

During initial access, the UE seeks access to the network in order to register and commence services. The random access (RA) serves as an uplink control procedure to enable the UE to access the network. Since the initial access attempt cannot be scheduled by the network, the RA procedure is by definition contention based. Collisions may occur and an appropriate contention-resolution scheme needs to be implemented. Including user data on the contention-based uplink is not spectrally efficient due to the need for guard periods and retransmissions. Therefore, it has been decided to separate the transmission of the random access burst (preamble), whose purpose is to obtain uplink synchronization, from the transmission of user data.

Preambles in LTE are based on Zadoff-Chu sequences. A Zadoff-Chu sequence of length N can be expressed, in the frequency domain, as $$X_{ZC}^{(u)}(k) = e^{-j\pi u \frac{k \cdot (k+1)}{N}} \quad (1)$$

where u is the index of the Zadoff-Chu sequence within the set of Zadoff-Chu sequences of length N=838. Out of one Zadoff-Chu sequence—in the following also denoted root sequence—multiple preamble sequences may be derived by cyclic shifting, were a shift is given by $s_{u,v}(n)=s_u(n-vN_{CS} \mod N)$, where $s_u$ is the inverse discrete Fourier transform (IDFT) of $X_{ZC}^{(u)}(k)$.

Root sequence planning may be done manually, using tools or other means when deploying or re-planning the network. This approach is, however, not satisfactory due to several reasons.

Firstly, there is a need to perform extensive field trials, which is very costly. Secondly, root sequences must be re-planned if network characteristics changes, e.g., coverage changes or the cell needs to be set to high-speed mode. And, thirdly, using tools or field trials is a slow process and not sufficiently responsive to changes in network, hence, it may take a while before a good allocation is performed.

SUMMARY

Accordingly, one objective of the present invention is to provide an improved method and communication network node for enabling automatic planning and handling of root sequences used at random access in a communication network system, wherein user equipments are accessing a cell being served by said communication network node.

According to a first aspect of the present invention this objective is achieved through a method as defined in the characterizing portion of claim 1, which specifies that automatic planning and handling of root sequences used at random access is enabled by a method which performs the steps of:

acquiring root sequence usage information from neighbouring cells;

detecting root sequence conflicts between root sequences used in said served cell and root sequences used in said neighbouring cells;

when no conflict is detected, selecting appropriate new root sequence(s);

otherwise, resolving detected root sequence conflicts.

According to a second aspect of the present invention this objective is achieved through a communication network node as defined in the characterizing portion of claim 11, which specifies that automatic planning and handling of root sequences used at random access is enabled by a communication network node comprising a processing unit arranged to perform the steps of:

acquiring root sequence usage information from neighbouring cells;

detecting root sequence conflicts between root sequences used in said served cell and root sequences used in said neighbouring cells;

when no conflict is detected, selecting appropriate new root sequence(s);

otherwise, resolving detected root sequence conflicts.

Further embodiments are listed in the dependent claims.

Thanks to the provision of a method and a communication network node, in which the root sequence allocated to a cell is automatically determined, whereby root sequence conflicts are resolved, very little or no human intervention is required when planning root sequences. This results in a reduction of OPEX. Also, the invention results in a shorter response time and faster reaction to changes in cell and/or network conditions.

Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION

Figure 1:
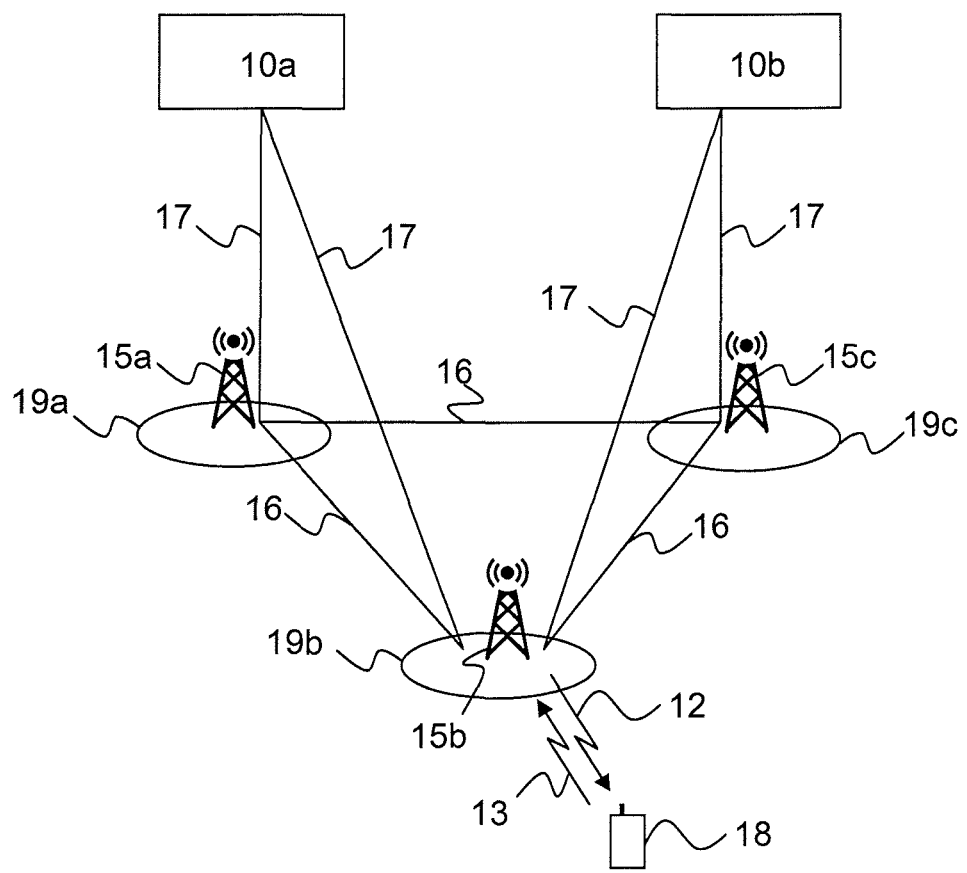
FIG. 1 shows an example of a LTE communication network architecture.

FIG. 1 depicts a communication system, including a radio access system (RAN) such as E-UTRAN, comprising at least one Radio Base Station (RBS), such as evolved Node B (eNB) 15a, 15b and 15c. The RAN is connected over an interface such as the S1-interface 17 to at least one Evolved Packet Core (EPC) network 10a and 10b, which is connected to external networks (not shown in FIG. 1) such as the Public Switched Telephone Network (PSTN) or the Integrated Services Digital Network (ISDN), and/or a connectionless external network as the Internet. Each EPC 10a and 10b comprises e.g. a Mobility Management Entity (MME) which handles control signalling for instance for mobility.

The RAN provides communication and control for a plurality of user equipments (UE) 18 (only one shown in FIG. 1) and each eNB 15a-15c is serving at least one cell 19 through and in which the UEs 18 are moving. The eNBs 15a-15c are communicating with each other over a communication interface 16, such as X2. The UEs each uses downlink (DL) channels 12 and uplink (UL) channels 13 to communicate with at least one eNB over a radio or air interface.

The user equipments 18 may be mobile stations such as mobile telephones ("cellular" telephones) and laptops with mobile termination and thus can be, for example, portable, pocket, hand-held, computer-included or car-mounted mobile devices which communicate voice and/or data with the RAN.

As described above in the background section, during initial access, the UE seeks access to the network in order to register and commence services.

The RA procedure serves two main purposes:

It lets the UE align its UL timing to that expected by the eNode B in order to minimize interfering with other UEs transmissions. UL time alignment is a requirement in E-UTRAN before data transmissions can commence.

It provides a means for the UE to notify the network of its presence and enables the eNode B to give the UE initial access to the system.

In addition to the usage during initial access, the RA will also be used when the UE has lost the uplink synchronization or when the UE is in an idle or a low-power mode.

Prior to sending a preamble, the UE shall synchronize to the downlink transmissions and read the BCCH. The BCCH will reveal where the RA time slots are located, which frequency bands can be used and which preambles (sequences) are available. LTE provides for each cell 64 such random IDs and thus 64 preambles. The set of preambles allocated to a cell shall not overlap with the set of preambles allocated to a neighbouring cell as this would cause errors and ambiguities in preamble detection.

Figure 2:
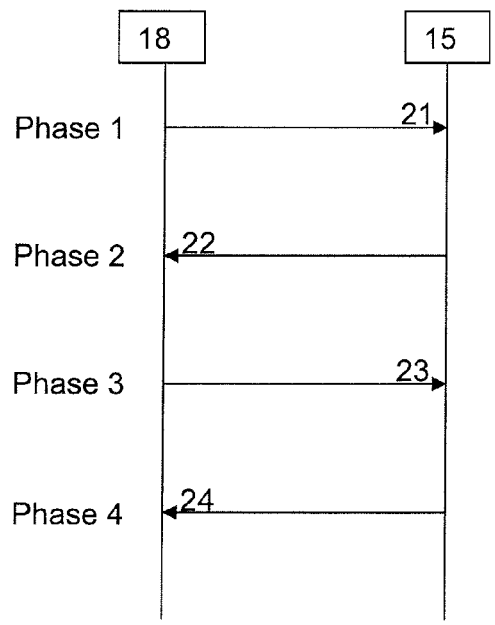
FIG. 2 is a diagram of a random access procedure.

The basic RA Procedure is a four-phase procedure as outlined in FIG. 2.

Phase 1 consists of transmission (step 21) of a random access preamble from the UE 18 to eNode B (eNB) 15, allowing the eNB to estimate the transmission timing of the UE.

Phase 2 consists of the network transmitting (step 22) a timing advance command to correct the uplink timing, based on the timing of arrival measurement in the first step. Uplink resources and a temporary identifier are assigned to the UE.

Phase 3 consists of signaling from the UE to the network using the uplink synchronization channel (UL-SCH) similar to normal scheduled data. A primary function of this message is to uniquely identify the UE. The exact content of this signaling depends on the state of the UE, e.g., whether it is previously known to the network or not. Thus, a Radio Resource Control (RRC) connection request is sent from the UE 18 to eNB 15 (step 23).

Phase 4, the final phase, is responsible for contention resolution in case multiple UEs tried to access the system on the same resource. Thus, a RRC connection setup is done (step 24).

For cases where the network knows, in advance, that a particular UE will perform a Random Access Procedure to acquire uplink synchronization, e.g., during handover (HO), a dedicated preamble is reserved and assigned to the UE under consideration. When the UE transmits the dedicated preamble in Phase 1, the network knows to which UE this preamble was assigned and can already at the time of detection of this preamble determine the identity of the UE. Thus no contention resolution is needed and the delay before data transmission can be resumed is reduced. However, here, dedicated and non-dedicated preambles are not distinguished between.

Preambles in LTE are based on Zadoff-Chu sequences. Due to the ideal ACF of Zadoff-Chu sequence multiple mutually orthogonal sequences can be derived from a single root sequence by cyclic shifting one root sequence multiple times the maximum allowed round trip time plus delay spread in time-domain. The number of shifts and as such the number of preambles that can be derived from a root sequence depends on, e.g., the coverage of the cell.

One disadvantage of Zadoff-Chu sequences is their behavior at high frequency offsets due to Doppler as a result of UE movement in relation to the BS. In order to cope with this problem LTE has a high-speed which disables certain cyclic shift values and root sequences so that transmitted preamble and round trip time can uniquely be identified. For cells larger than approximately 35 km no set of 64 preambles exists that allows unique identification of transmitted preamble and estimation of propagation delay, i.e. cells larger than 35 km cannot be supported in high speed mode. As such each root sequence supports a maximum shift in high-speed mode and has a certain cubic metric (CM).

The random access preamble sequences are ordered according to table 1 below. The table separates all PRACH sequences into two groups based on the QPSK cubic metric (CM) value using a fixed 1.2 dB threshold. Within each CM-group (high and low CM) the sequences are further grouped according to the maximum allowed cyclic shift and as such cell size at high speed.

TABLE 1

Mapping between maximum cyclic shift length ($N_{CS}$) in high-speed mode, logical root sequence and root sequence index.

| | Maximum $N_{CS}$ | Logical root sequence number | Physical root sequence number u | | |
|---|---|---|---|---|---|
| Low CM | — | 0-23 | 129, 710, ... | | |
| | 15 | 24-29 | 56, 783, ... | \| | Increasing |
| | 18 | 30-35 | 80, 759, ... | \| | maximum |
| | ... | ... | ... | ↓ | |
| | 237 | 384-455 | ... | | |
| High CM | 237 | 456-513 | ... | | |
| | ... | ... | ... | | |
| | 22 | 804-809 | ... | ↑ | |
| | 18 | 810-815 | ... | \| | Increasing |
| | 15 | 816-819 | ... | \| | maximum |
| | — | 820-837 | ... | | |

For example logical root sequences 30-35 support shifts up to $N_{CS}$=18, meaning that a shift smaller than 18 is allowed, however, a shift greater than 18 is not allowed. This has, as such, implications on which root sequences that may be used when a cell is in high-speed mode and has a certain coverage.

In order for the UE to determine the 64 preambles allocated for the cell, the following information is broadcasted:
  Initial logical root sequence (ILRS),
  Shift $N_{CS}$,
  High-speed flag The ILRS is the first logical root sequence to be used in the cell. If the ILRS does not accommodate all 64 preambles, then additional logical root sequences consecutive to the ILRS are used (see table 1). In other words, ILRS points to the first logical root sequence used by the cell and an additional set of logical root sequences following the ILRS are used depending on the shift $N_{CS}$ and high-speed flag.

This implies that the UE itself must derive the preambles used in the cell. Another implication is that the root sequences (logical and physical) allocated to a cell must be contiguous. Another consequence is that set of root sequences allocated to a cell must not overlap with the set of root sequences allocated to a neighbouring cell.

Figure 3:
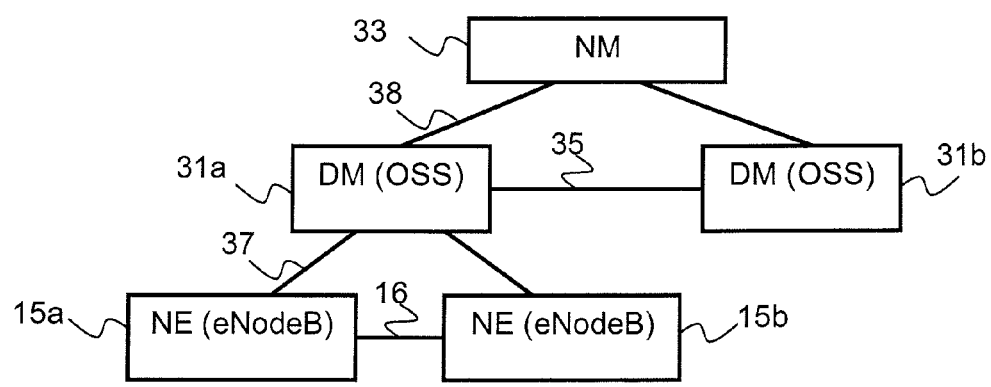
FIG. 3 shows an embodiment of a management system.

The management system according to embodiments of this invention is shown in FIG. 3. The node elements (NE) 15*a*, 15*b*, also referred to as eNodeB, are managed by a domain manager (DM) 31*a*, 31*b*, also referred to as the operation and support system (OSS). A DM 31*a*, 31*b* may further be managed by a network manager (NM) 33. Two NEs 15*a*, 15*b* are interfaced by X2 16, whereas the interface between two DMs 31*a*, 31*b* is referred to as Itf-P2P 35. The interface 37 between the NE 15 and the DM 31 is called Itf-S and the interface 38 between the DM 31 and the NM 33 is called Itf-N.

Embodiments of the present invention describe a method and corresponding apparatus in a communication system for automatically determine the root sequence allocated to a cell. This consists of method for detecting and resolving root sequence conflicts.

Embodiments of the invention can be applied to a newly deployed cell (or eNodeB), a cell that needs root sequence reallocation due to changed conditions (e.g., the cell needs to be set to high-speed mode), or in general any set of cells that would benefit from a root sequence reallocation.

A cell that needs root sequence (re)allocation, hereafter referred to as the "reconfiguring cell", uses information available in its neighbouring cells in order to derive the root sequences to be used in the own cell. As such it is assumed henceforth that neighbour relations are known for each cell in the considered network. Two cells are related, i.e., there exists a neighbour relation between them, if their coverage overlaps. Further it is assumed that the cyclic shift $N_{CS}$ and whether the cell is in the high-speed mode is known for each cell.

Figure 4:
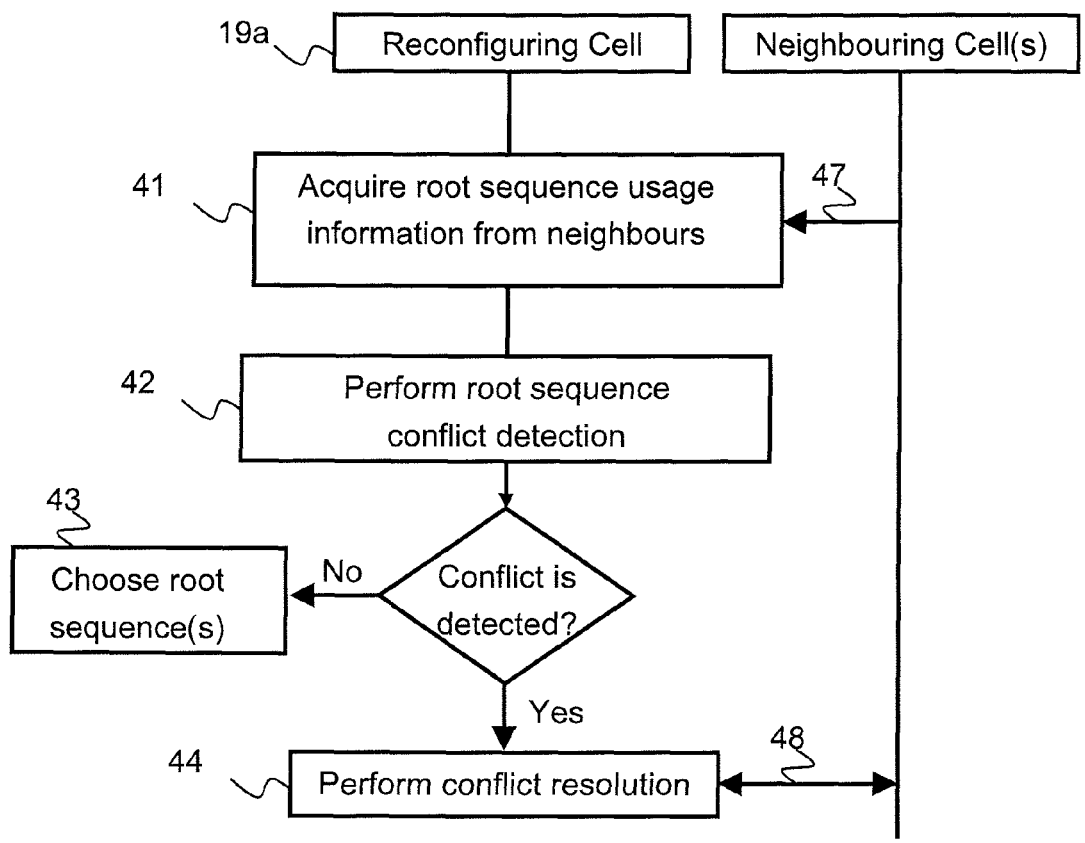
FIG. 4 is a flowchart showing an embodiment of the present invention.

The sequence of actions taken by a reconfiguring cell 19*a* is shown in FIG. 4. First, information regarding the root sequences used by neighbouring cells is obtained (step 41). This step consists of an exchange of one or several messages, whereby the reconfiguring cell acquires necessary information needed, shown with arrow 47, to compute the root sequence(s) allocated to the neighbouring cells. The second step consists of detecting a so-called root sequence conflict, also referred to as conflict henceforth (step 42). If a conflict is not detected an appropriate root sequences is chosen (step 43), otherwise a conflict resolution is performed (step 44), which involves further interaction with neighbouring cells, illustrated with arrow 48.

Below further details of embodiments of the invention are described. Further, herein a set of solutions involving only one reconfiguring cell is described. It is obvious to the person skilled in the art that similar techniques may be applied when multiple reconfiguring cells are available, i.e., multiple cells are reconfiguring their root sequences.

Further, in the figures, where a reconfiguring cell and neighbouring cell(s) are shown along with interactions (using arrows), does not necessarily imply exchanges of messages or any other means of communication between corresponding eNodeBs of those cells. The interactions are simply shown in order to illustrate the information needed from a neighbouring cell and potential changes to the neighbouring cell. Any action described may be executed in the corresponding eNodeB, DM, or any other node in the network.

Acquiring Root Sequence Usage Information from Neighbours

When acquiring root sequence usage information from neighbours, the information regarding the root sequence usage in all neighbours of the reconfiguring cell is gathered. The type of information gathered includes any information, which enables the determination of root sequences used by neighbours of the reconfiguring cell. Examples of this information comprise the following elements:
  all root sequences used by a neighbour
  initial logical root sequence (ILRS), shift $N_{CS}$, high-speed flag Performing Root Sequence Conflict Detection Having obtained all the root sequences used by the neighbours of the reconfiguring cell, the root sequences that are available for the reconfiguring cell may be identified. This is for example done using a root sequence usage map (RSUM), which has one entry for each root sequence (i.e., there are 839 entries), one column that gives whether the root sequence is used by a neighbour, other columns that identify neighbours using this particular root sequence. One example of an RSUM is shown in Table 2 where the logical root sequences are enumerated along with other information revealing whether the logical root sequences are used by neighbours.

TABLE 2

Example of an RSUM

| Logical Root Sequence | Used | Allocated to Neighbour |
|---|---|---|
| 1 | Yes | N1 |
| 2 | Yes | N1, N2 |
| 3 | No | |
| 4 | Yes | N3 |
| 5 | No | |
| ... | | |
| 31 | No | |
| 32 | No | |
| ... | ... | ... |
| 835 | Yes | N10 |
| 836 | Yes | N10 |

For the sake of conflict detection the following notion is introduced. We say that an initial logical root sequence (ILRS) of a cell is valid if and only if:
  All root sequences of the cell do not overlap with root sequences used by neighbours. This can be investigated using for example an RSUM.
  All root sequences of the cell support the shift $N_{CS}$ in case the reconfiguring cell is in high-speed mode.

The definition of a valid ILRS may be extended to capture requirements on the CM of the logical root sequences allocated to a reconfiguring cell.

Considering table 2, we note that ILRS=1 is not valid since logical root sequence 1 is already used by neighbours. However, ILRS=3 is valid if all 64 preambles may be derived from one root sequence. If at least two root sequences must be used then ILRS=3 is not valid, since this would imply that at least logical root sequences 3 and 4 must be used.

Next, all valid ILRSs of the reconfiguring cell are identified. If no such valid ILRS is identified then a root sequence conflict is identified. If at least one valid ILRS is identified then no conflicts is detected and one of the valid ILRSs are chosen for the reconfiguring cell.

Performing Conflict Resolution

Figure 5:
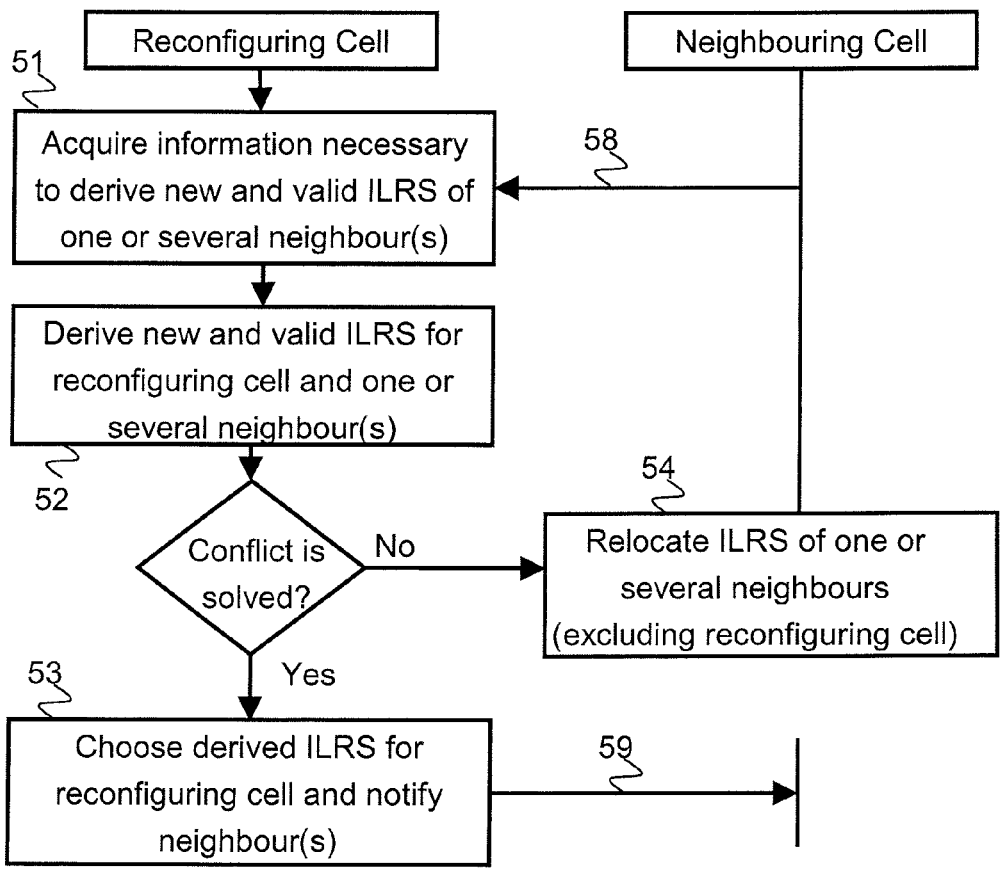
FIG. 5 is a flowchart showing a conflict resolution according to embodiments of the present invention.

If no valid ILRS is found then the root sequence conflict needs to be resolved. This is effectively done by moving the ILRS of one or several neighbours in order to free some (logical root sequence) space to be used by the reconfiguring cell. The outline of this solution is presented in FIG. 5.

First the information necessary to derive new and valid ILRS for one or several neighbour(s) is gathered (step 51). It should be obvious that a wide variety of options exist regarding the required information from a neighbour, illustrated with arrow 58, for example:
  all valid ILRSs of the neighbour, or
  ILRS, shift $N_{CS}$, high-speed mode flag of the neighbour, and further additional information regarding the root sequence usage of the neighbours of the neighbour such as ILRS, shift $N_{CS}$, and high-speed flag.

Using this information, the reconfiguring cell chooses an ILRS and computes a new ILRS for one or several of its neighbours (step 52) such that (i) the ILRS of the reconfiguring cell is valid, and (ii) the new ILRS of the neighbouring cell(s) is valid, whereby the new ILRS of the neighbouring cells(s) are changed.

Then the derived ILRS for the reconfiguring cell is chosen (step 53) and the neighbours are notified, illustrated with arrow 59.

Figure 6:
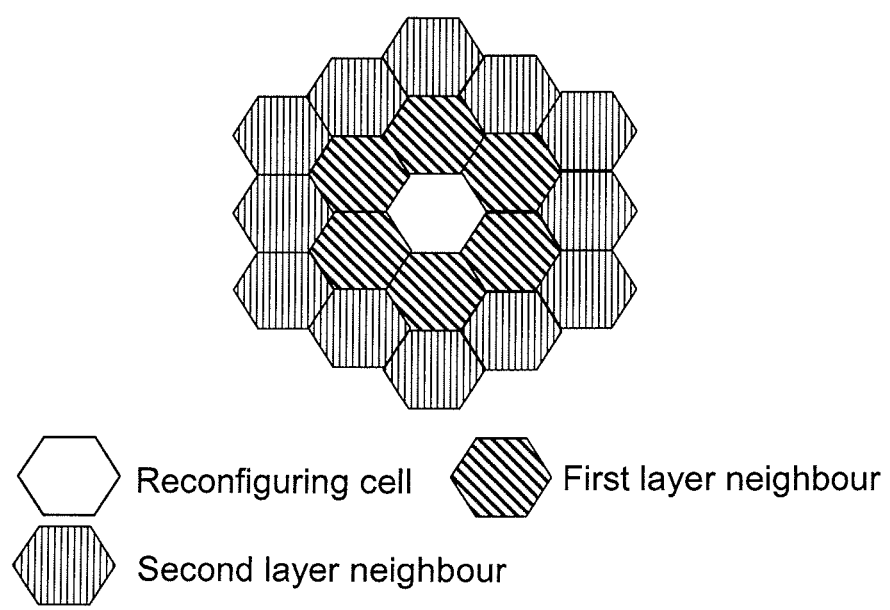
FIG. 6 illustrates a definition of a first layer and a second layer neighbour.

It may still be the case that no valid ILRS can be found for the reconfiguring cell since, e.g., there may be little possibility to move the root sequences used by neighbouring cells. The neighbours of the reconfiguring cell are referred to as the first layer neighbours, whereas the neighbours of the first layer neighbours are referred to as the second layer neighbours, see FIG. 6.

If the conflict cannot be solved this implies that the second layer neighbours need to be involved in relocation of the root sequences (step 54). This effectively means that it is attempted to move the root sequences of the second layer neighbours in order to enable new set of valid ILRS of the first layer neighbours, i.e. the neighbour of the reconfiguring cell. In other words, one or several first layer neighbours try to relocate the ILRS of one or several second layer neighbours.

Architecture

It should be obvious for the person skilled in the art that various architectures embody the solution described in embodiments of the present invention, e.g.:
  The actions taken by the reconfiguring cell and the neighbouring cells are executed in the respective eNodeB. Messages between the reconfiguring cell and the neighbouring cells are exchanged over the X2 interface.
  The actions taken by the reconfiguring cell and the neighbouring cells are executed in the DM of the respective eNodeBs. If the eNodeBs are located under different DMs, then exchange of information takes place using the Itf-P2P interface.
  The action taken by the reconfiguring cell and the neighbouring cells are executed in NM.

Triggering Actions

The root sequence conflict detection and resolution and associated mechanisms may be executed when the characteristics of the network changes, e.g.:
  when a cell or eNodeB is deployed
  when the characteristics of a cell changes, e.g., a cell moves to high-speed mode and cell size increases, and
  continuously in all or a subset of the cells.

Handling of Specific Cells

In the above, it is assumed that it is possible to alter the set of allocated root sequences of all cells. However, some specific cells may be handled differently, for example
  it is undesired to spend time on reallocations for each of specific cells, because the number of specific cells is large, and therefore the total effort and time needed is unmotivated
  it is obvious how the parameters specifying the sequences for the specific cells should be set, and therefore the total allocation problem is simplified One example of specific cells is the closed subscriber group (CSG) cells, popularly exemplified by home eNodeBs.

The specific cells may be considered to have well defined properties, for example
  high velocity users are unlikely
  cell sizes are small
  dispersion and frequency selectivity is low Therefore, it is possible to tailor a root sequence allocation (maybe one root sequence suffices) that meet the pre-determined requirements of a specific cell. Furthermore, it is possible to define a reserved set of R root sequence allocations, and then select an allocation to a specific cell from this reserved set.

Each cell in LTE is locally identified by a non-unique fingerprint in terms of a reference signal. This reference signal is used for channel estimation and physical layer measurements. Each reference signal is associated to an enumerated identity, the physical cell identity, the PCI. This means that a cell is assigned a PCI, which has a one to one correspondence to a reference signal. In total, there are 504 PCIs. This is similar to the downlink scrambling code in WCDMA.

It has been discussed in the art to have reserved ranges of PCIs reserved for certain cell types. For example, all CSG cells are allocated PCIs from a reserved range. One way to allocate root sequences to a specific cell that also is allocated PCIs from a reserved range is to let the PCI imply a root sequence allocation in the reserved set of root sequence allocations.

Moreover, if there are mechanisms that try to avoid PCI conflicts between neighbouring cells that also apply to specific cells, then the invented PCI implication to a root sequence allocation also avoids root sequence conflicts between neighbouring cells.

Figure 7:
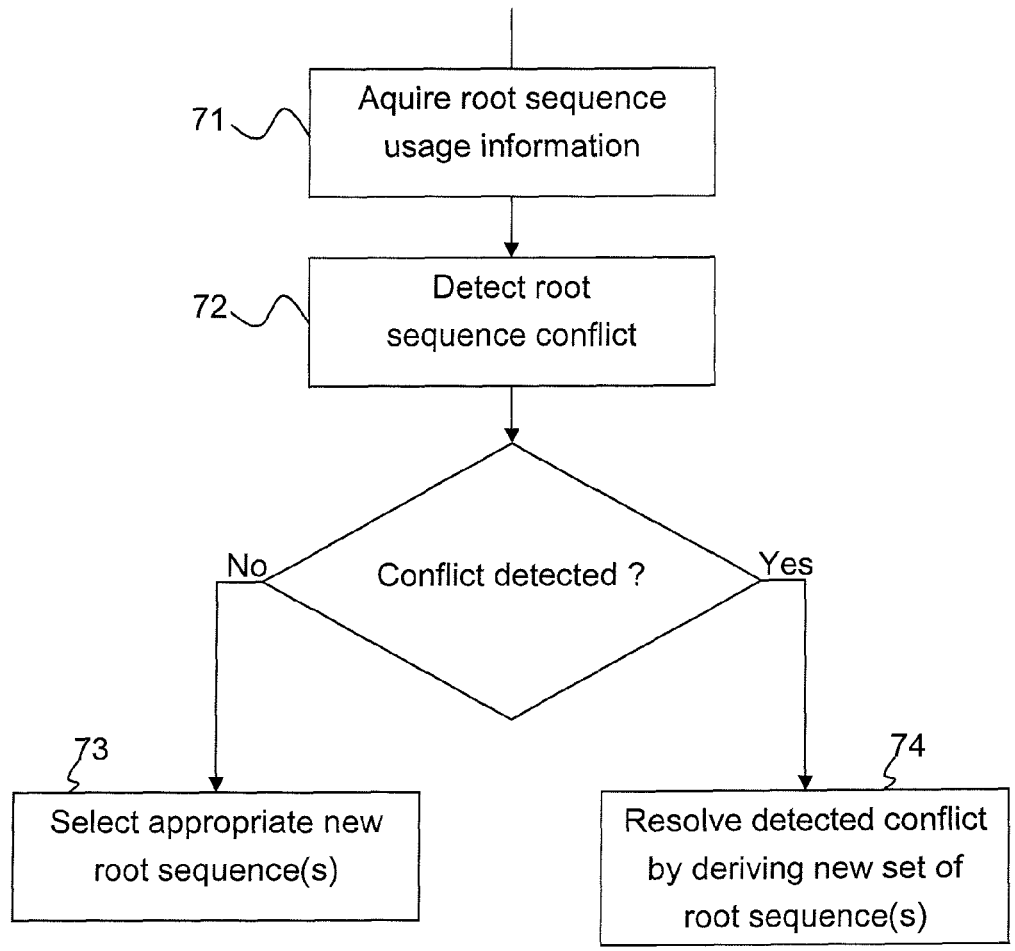
FIG. 7 is a flowchart over embodiments of the present inventive method.

According to one embodiment of the present invention a procedure in a communication network node of enabling automatic planning and handling of root sequences used at random access in a communication network system, wherein user equipments are accessing a cell being served by said communication network node, as shown in FIG. 7, is provided. The procedure comprises the steps of:
  acquiring root sequence usage information from neighbouring cells (step 71);
  detecting root sequence conflicts between root sequences used in said served cell and root sequences used in said neighbouring cells (step 72);
  when no conflict is detected, selecting appropriate new root sequence(s) (step 73);
  otherwise, resolving detected root sequence conflicts by deriving a new set of root sequences (step 74).

According to some embodiments, the step of resolving detected root sequence conflicts comprises the step of deriving new and valid initial logical root sequences for one or more neighbouring cell(s).

According to some embodiments, the root sequences available for said served cell is identified by utilizing a notion of valid initial logical root sequences.

According to some embodiments, a root sequence conflict is detected when valid initial logical root sequences cannot be found.

According to some embodiments, the step of resolving detected root sequence conflicts comprises the step of deriving new and valid initial logical root sequences for one or more neighbouring cell(s).

According to some embodiments, when said detected conflicts persist, the method further comprises the step of expanding said conflict resolution to other second layer cells by deriving new and valid initial logical root sequence(s) for one or more cell(s) in said second layer.

According to some embodiments, the method further comprises the step of initiating said automatic handling of said root sequences when characteristics in the communication network system changes.

According to some embodiments, the method further comprises the step of continuously executing said automatic handling of said root sequences in all or a subset of cells in said communication network system.

According to some embodiments, the method further comprises the steps of defining a reserved set of root sequence allocations; and, selecting an allocation to a specific cell from said reserved set of root sequence allocations.

Figure 8:
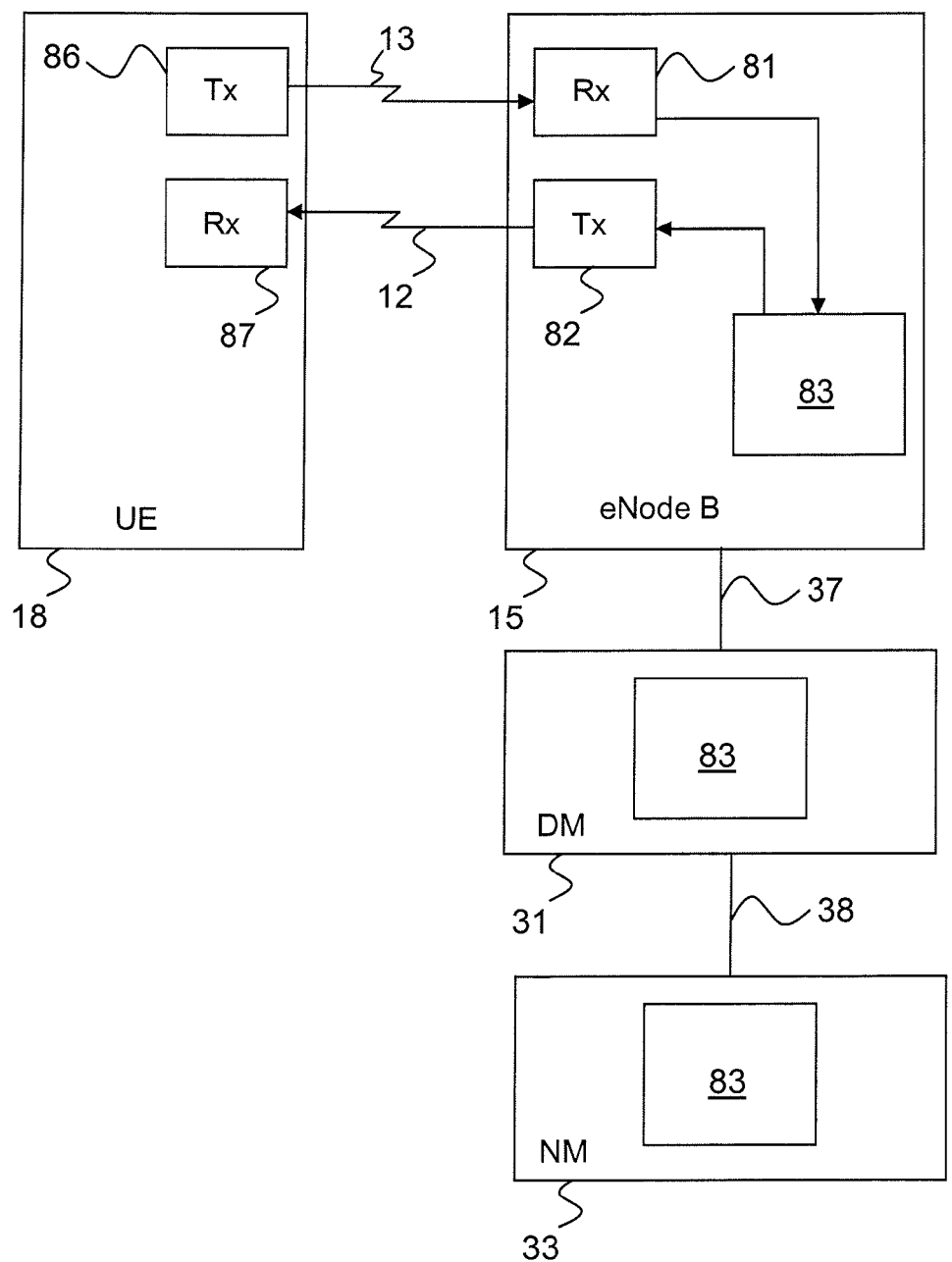
FIG. 8 is a simplified block diagram showing embodiments of the present invention.

FIG. 8 is a block diagram showing a user equipment 18, a radio base station (RBS) 15, such as eNode B, a domain manager 31 and a network manager 33 for enabling automatic planning and handling of root sequences used at random access in a communication network system, wherein user equipments 18 are accessing a cell being served by a communication network node, such as the eNode B 15, the domain manager 31 or the network manager 33. The RBS 15 comprises a radio transmitter 82 and a receiver 81. The transmitter 82 is transmitting data to a receiver 87 of the user equipment 18 over a radio interface on the downlink channel 12. The receiver 81 is receiving data from the user equipment 18 on the uplink channel 13. The RBS 15 optionally further comprises a processing unit 83 configured to:

- acquiring root sequence usage information from neighbouring cells;
- detecting root sequence conflicts between root sequences used in said served cell and root sequences used in said neighbouring cells;
- when no conflict is detected, selecting appropriate new root sequence(s);
- otherwise, resolving detected root sequence conflicts by deriving a new set of root sequences.

The user equipment 18 comprises a radio transmitter 86 arranged to transmit data packets to the receiver 81 of the RBS 15 over the radio interface on the uplink channel 13 and a receiver 87 arranged to receive data packets transmitted from the transmitter 82 of the RBS 15 on the downlink channel 12.

The DM 31 is communicating with the RBS 15 via the interface 37 and optionally comprises a processing unit 83 configured to

- acquiring root sequence usage information from neighbouring cells;
- detecting root sequence conflicts between root sequences used in said served cell and root sequences used in said neighbouring cells;
- when no conflict is detected, selecting appropriate new root sequence(s);
- otherwise, resolving detected root sequence conflicts by deriving a new set of root sequences.

The NM 33 is communicating with the DM 31 via the interface 38 and optionally comprises a processing unit 83 configured to

- acquiring root sequence usage information from neighbouring cells;
- detecting root sequence conflicts between root sequences used in said served cell and root sequences used in said neighbouring cells;
- when no conflict is detected, selecting appropriate new root sequence(s);
- otherwise, resolving detected root sequence conflicts by deriving a new set of root sequences.

According to some embodiments of the invention, the processing unit 83 is further configured to identify root sequences available for said served cell when performing said step of detecting root sequence conflicts.

According to some embodiments of the invention, the processing unit 83 is further configured to identify said root sequences available for said served cell by utilizing a notion of valid initial logical root sequences.

According to some embodiments of the invention, the processing unit 83 is further configured to detect a root sequence conflict when valid initial logical root sequences cannot be found.

According to some embodiments of the invention, the processing unit 83 is further configured to derive new and valid initial logical root sequences for one or more neighbouring cell(s) when performing the step of resolving detected root sequence conflicts.

According to some embodiments of the invention, when said detected conflicts persist, the processing unit 83 is further configured to expand said conflict resolution to other second layer cells by deriving new and valid initial logical root sequence(s) for one or more cell(s) in said second layer.

According to some embodiments of the invention, said communication network node 15, 31, 33 is arranged to initiate said automatic handling of said root sequences when characteristics in the communication network system changes.

According to some embodiments of the invention, said communication network node 15, 31, 33 is arranged to continuously execute said automatic handling of said root sequences in all or a subset of cells in said communication network system.

According to some embodiments of the invention, the processing unit 83 is further configured to perform the steps of defining a reserved set of root sequence allocations; and, selecting an allocation to a specific cell from said reserved set of root sequence allocations.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural and vice versa.

Numerals included within parentheses in the accompanying claims are intended to assist understanding of the claims and should not be construed in any way to limit subject matter claimed by these claims.

The invention claimed is:

1. A method in a communication network node of enabling automatic planning and handling of root sequences used at random access in a communication network system, wherein multiple user equipments are accessing a cell being served by said communication network node, the method comprising:
   acquiring root sequence usage information from neighboring cells;
   detecting root sequence conflicts between root sequences used in said served cell and root sequences used in said neighboring cells;
   when no conflict is detected, selecting one or more new root sequences; and
   otherwise, resolving said detected root sequence conflicts.

2. The method according to claim 1, wherein detecting root sequence conflicts further comprises identifying root sequences available for said served cell.

3. The method according to claim 2, wherein the root sequences available for said served cell are identified by utilizing a notion of valid initial logical root sequences.

4. The method according to claim 1, wherein a root sequence conflict is detected when valid initial logical root sequences cannot be found.

5. The method according to claim 1, wherein resolving detected root sequence conflicts comprises deriving new and valid initial logical root sequences for one or more neighboring cell(s).

6. The method according to claim 1, wherein when said detected conflicts persist, the method further comprises expanding said conflict resolution to other second layer cells by deriving new and valid initial logical root sequence(s) for one or more cell(s) in said second layer.

7. The method according to claim 1, further comprising initiating said automatic handling of said root sequences when characteristics in the communication network system change.

8. The method according to claim 1, further comprising continuously executing said automatic handling of said root sequences in all or a subset of cells in said communication network system.

9. The method according to claim 1, further comprising:
   defining a reserved set of root sequence allocations; and
   selecting an allocation to a specific cell from said reserved set of root sequence allocations.

10. A communication network node for enabling automatic planning and handling of root sequences used at random access in a communication network system, wherein multiple user equipments are accessing a cell being served by said communication network node, said communication network node comprises a processing unit configured to:
    acquire root sequence usage information from neighboring cells;
    detect root sequence conflicts between root sequences used in said served cell and root sequences used in said neighboring cells;
    when no conflict is detected, select one or more new root sequences; and
    otherwise, resolve said detected root sequence conflicts.

11. The communication network node according to claim 10, wherein said processing unit is further configured to identify root sequences available for said served cell when detecting root sequence conflicts.

12. The communication network node according to claim 10, wherein said processing unit is configured to detect a root sequence conflict when valid initial logical root sequences cannot be found.

13. The communication network node according to claim 10, wherein said processing unit is further configured to derive new and valid initial logical root sequences for one or more neighboring cell(s) when resolving detected root sequence conflicts.

14. The communication network node according to claim 10, wherein when said detected conflicts persist, said processing unit is further configured to expand said conflict resolution to other second layer cells by deriving new and valid initial logical root sequence(s) for one or more cell(s) in said second layer.

15. The communication network node according to claim 10, wherein said communication network node is configured to initiate said automatic handling of said root sequences when characteristics in the communication network system changes.

* * * * *

UNITED STATES PATENT AND TRADEMARK OFFICE
CERTIFICATE OF CORRECTION

PATENT NO. : 8,526,996 B2
APPLICATION NO. : 13/139738
DATED : September 3, 2013
INVENTOR(S) : Amirijoo et al.

Page 1 of 1

It is certified that error appears in the above-identified patent and that said Letters Patent is hereby corrected as shown below:

On Title Page 2, item (56), under "OTHER PUBLICATIONS", in Column 2, Line 4, delete "Generaton" and insert -- Generation --, therefor.

In the Drawings

In Fig. 7, Sheet 6 of 7, delete "Aquire" and insert -- Acquire --, therefor.

In the Specification

In Column 1, Line 3, delete "TECHNICAL HELD" and insert -- TECHNICAL FIELD --, therefor.

In Column 6, Line 23, delete "flag" and insert -- flag. --, therefor.

In Column 8, Line 21, delete "low" and insert -- low. --, therefor.

Signed and Sealed this
Twenty-second Day of July, 2014

Michelle K. Lee
*Deputy Director of the United States Patent and Trademark Office*